(12) United States Patent
Itoh et al.

(10) Patent No.: US 6,318,974 B1
(45) Date of Patent: Nov. 20, 2001

(54) OIL PUMP FOR SEPARATE LUBRICATION

(75) Inventors: Hisanori Itoh; Kenichi Kubota, both of Iwate-ken (JP)

(73) Assignee: Mikuni Adec Corporation, Iwate-ken (JP)

( * ) Notice: Subject to any disclaimer, the term of this patent is extended or adjusted under 35 U.S.C. 154(b) by 0 days.

(21) Appl. No.: 09/557,410

(22) Filed: Apr. 24, 2000

(30) Foreign Application Priority Data

May 18, 1999 (JP) .................................................. 11-136627

(51) Int. Cl.[7] ....................................................... F04B 7/04
(52) U.S. Cl. ........................... 417/315; 285/205; 417/500
(58) Field of Search .................................. 417/315, 461, 417/466, 498, 500; 285/205, 206

(56) References Cited

U.S. PATENT DOCUMENTS

| | | | |
|---|---|---|---|
| 3,101,057 | * 8/1963 | Heiser | 417/500 |
| 4,231,716 | * 11/1980 | Kubota et al. | 417/315 |
| 4,452,128 | * 6/1984 | Stoll | 285/DIG. 22 |
| 4,787,832 | * 11/1988 | Fukasawa et al. | 417/500 |
| 4,797,073 | * 1/1989 | Kubota et al. | 417/500 |
| 4,904,163 | * 2/1990 | Tachi et al. | 417/500 |
| 5,370,507 | * 12/1994 | Dunn et al. | 417/389 |

FOREIGN PATENT DOCUMENTS 8-270890 * 10/1996 (JP) .

* cited by examiner

Primary Examiner—Michael Koczo
(74) Attorney, Agent, or Firm—Ladas & Parry

(57) ABSTRACT

The invention provides a compact oil pump for separate lubrication having no back gear with the rotation of an engine as a driving source even when the engine is reversely rotated. In the oil pump for separate lubrication, a distributor is fitted to a cylinder 1a arranged in a pump body so as to be rotated and moved in an axial direction; a plunger is fitted to a pump chamber arranged in the distributor so as to go in and out of the pump chamber; a shaft arranged on a side opposed to the pump chamber of the distributor is covered with a worm wheel engaged with a driving worm, and a pin inserted into the shaft is engaged with a concave portion formed in the worm wheel with play; a lead cam arranged in the worm wheel comes in press contact with a discharging amount setting cam and the plunger 3 comes in press contact with a cover for closing the cylinder by a spring interposed between the distributor and the plunger; an inlet-outlet path, communicated with the pump chamber and opened to a circumferential face of the distributor is arranged in the distributor; and an outlet hole, and an inlet hole conforming to an opening portion of the inlet-outlet path, in a position in the axial direction of the cylinder are arranged in the pump body.

1 Claim, 5 Drawing Sheets

OIL PUMP FOR SEPARATE LUBRICATION

BACKGROUND OF THE INVENTION

1. Field of the Invention

This invention relates to an oil pump for separate lubrication for supplying a lubricating oil to an automobile, a motor bicycle, a snowmobile, etc., and particularly relates to a compact reversible oil pump suitable for the snowmobile.

2. Description of the Background Art

The present applicant proposed a reversible oil pump in Japanese Patent Application No. 10-64286. This reversible oil pump is a lubricating oil pump with the rotation of an engine as a pump driving source and can be applied to a 2-cycle engine such as a snowmobile, etc. having no back gear. In this reversible oil pump, a cylinder is rotatably arranged in a cylindrical space formed in a pump body, and a worm wheel engaged with a driving worm is integrally formed in a plunger arranged in a pump chamber of this cylinder such that the plunger can freely go in and out of the pump chamber. A lead cam arranged in the worm wheel comes in press contact with a discharging amount setting cam. The worm wheel and the cylinder are engaged with each other with play.

A pump action is taken by making the plunger go in and out of the pump chamber of the cylinder. An oil is discharged or sucked from an inlet-outlet path communicated with the pump chamber and opened to a cylinder circumferential face to an outlet hole or an inlet hole arranged in the pump body. Since the worm wheel and the cylinder are engaged with each other with play, the relation of a rotating position of the cylinder and going in and out timings of the pump chamber of the cylinder is changed by a rotating direction of the worm wheel, and the oil is sucked from the inlet hole of the pump body and is discharged from the outlet hole in the rotation in any direction. Namely, the pump is set to be reversibly rotated.

In the above reversible oil pump, the plunger goes in and out of the pump chamber from an arranging side of the driving worm. Accordingly, the plunger is arranged between the outlet hole of the pump body and the driving worm so that a problem exists in that the outlet hole is separated from the driving worm and the pump is large-sized.

In a proposal described in Japanese Laid-Open (Kokai) Patent No. 8-270890 with respect to a nipple of the oil pump for separate lubrication, an engaging claw is arranged in a portion in which a nipple body made of synthetic resin is inserted into the pump body. The engaging claw is engaged with a step difference portion of an outlet port of the pump body. A noncircular inner circumferential face of a direction holding member engaged with the pump body is fitted to a noncircular outer circumferential face of the nipple body to stop rotation of the nipple body.

In the above nipple of the oil pump for separate lubrication, the step difference portion engaged with the engaging claw is arranged in the outlet port of the pump body so that boring processing is required and manufacturing cost is increased. Further, since a portion inserted into a hose for supplying the oil to the engine is thin, a problem exists in that this portion is easily broken when this portion is formed by synthetic resin.

SUMMARY OF THE INVENTION

In consideration of the above problems, an object of the present invention is to provide an oil pump for separate lubrication in which the oil pump can be made compact and manufacturing cost is low and no nipple is easily broken.

In an oil pump for separate lubrication in the present invention, a distributor is fitted to a cylinder arranged in a pump body so as to be rotated and moved in an axial direction; a plunger is fitted to a pump chamber arranged in said distributor so as to go in and out of the pump chamber; a shaft arranged on a side opposed to the pump chamber of said distributor is covered with a worm wheel engaged with a driving worm, and a pin press-fitted into said shaft is engaged with a concave portion formed in said worm wheel with play; a lead cam arranged in said worm wheel comes in press contact with a discharging amount setting cam and said plunger comes in press contact with a cover for closing said cylinder by a spring interposed between said distributor and the plunger; an inlet-outlet path communicated with said pump chamber and opened to a circumferential face of the distributor is arranged in said distributor; and an outlet hole and an inlet hole conforming to an opening portion of said inlet-outlet path in a position in the axial direction of the cylinder are arranged in said pump body.

In the above oil pump for separate lubrication, a nipple for connection to a hose for supplying an oil to an engine is fitted to a nipple fitting hole of the pump body communicated with said outlet hole of the oil pump for separate lubrication; said nipple is constructed such that a metallic pipe connected to the hose is adhered to a side face of a nipple body made of resin; a basic end portion of said nipple body is covered with an O-ring and the O-ring is inserted into said fitting hole; and a nipple fixing plate fitted to a groove formed in a head portion of said nipple body and pressing the nipple body is fastened and attached to the pump body.

DESCRIPTION OF THE PREFERRED EMBODIMENTS

Figure 1:
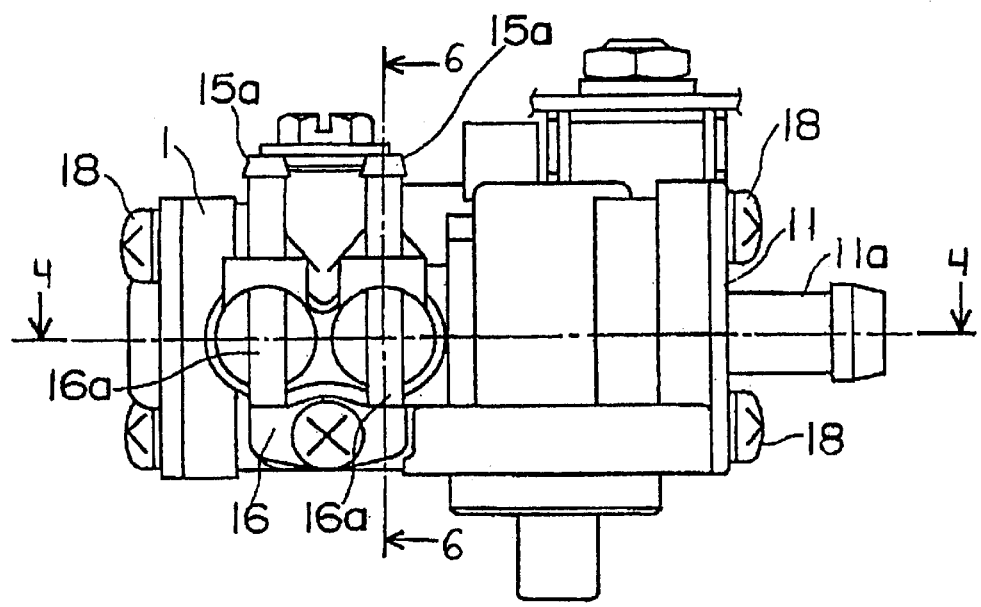
FIG. 1 is a bottom view showing an oil pump for separate lubrication in an embodiment of the present invention.
Figure 2:
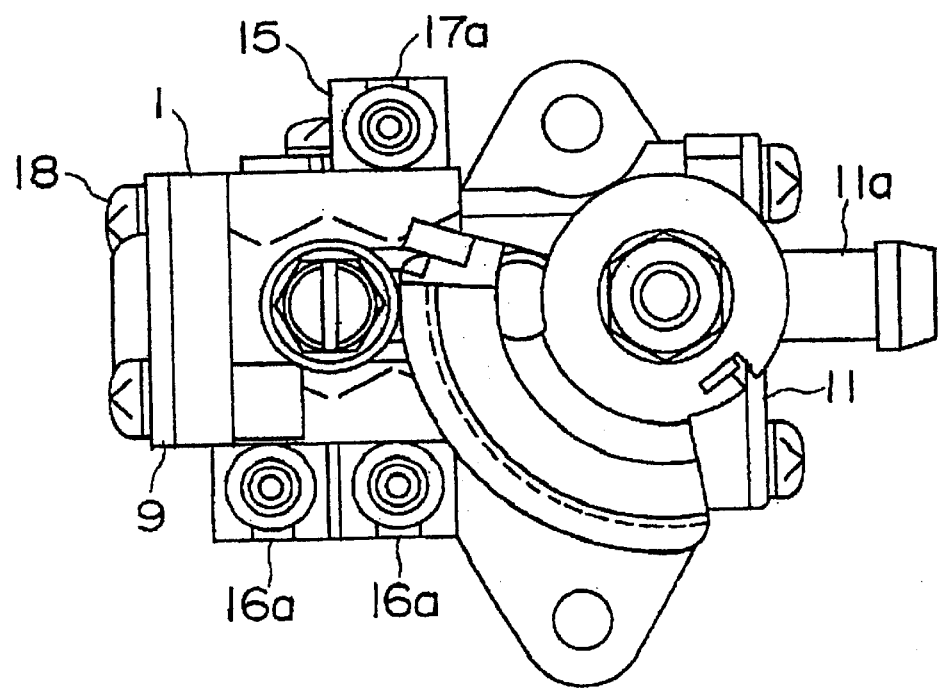
FIG. 2 is a rear view showing the oil pump for separate lubrication.
Figure 3:
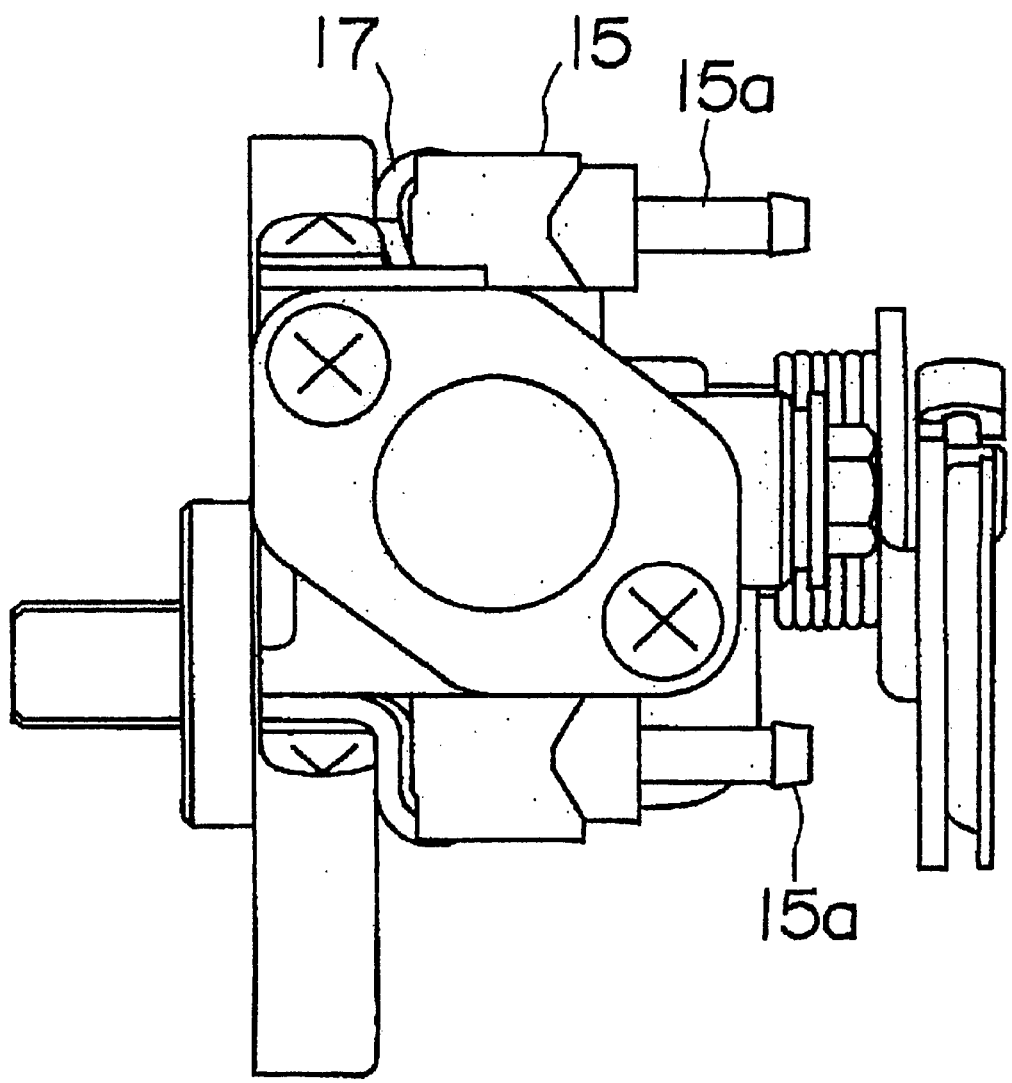
FIG. 3 is a side view showing the oil pump for separate lubrication.
Figure 4:
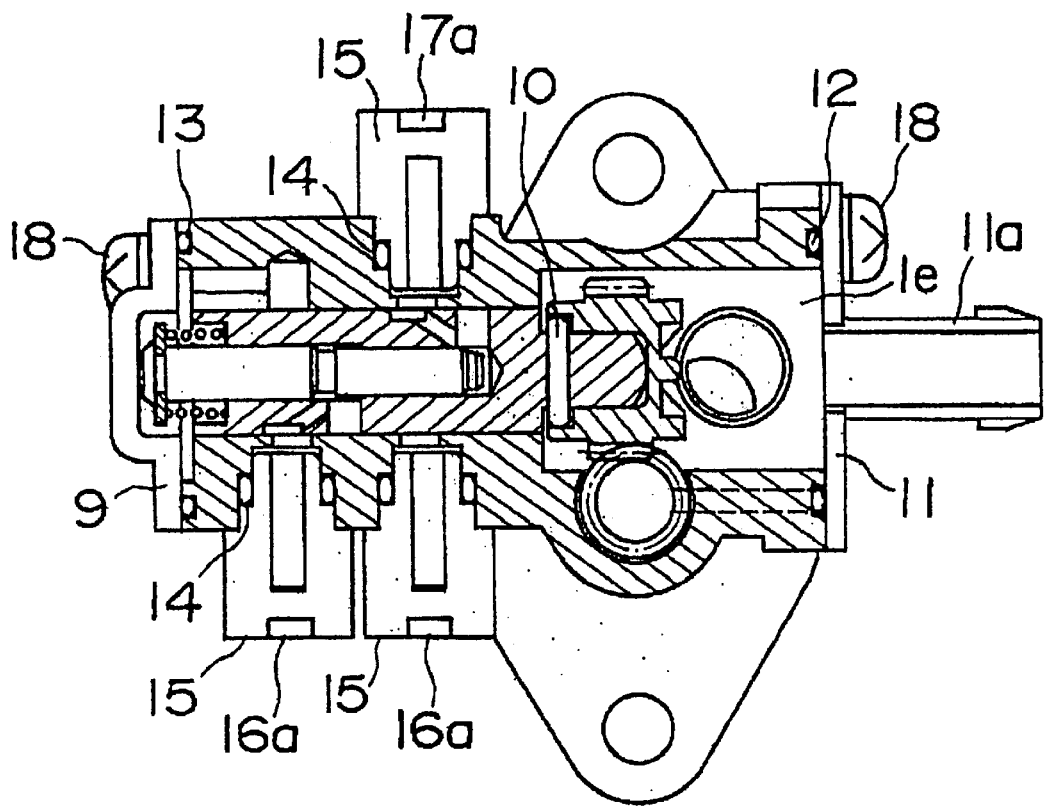
FIG. 4 is a cross-sectional view taken along line 4—4 in FIG. 1.
Figure 5:
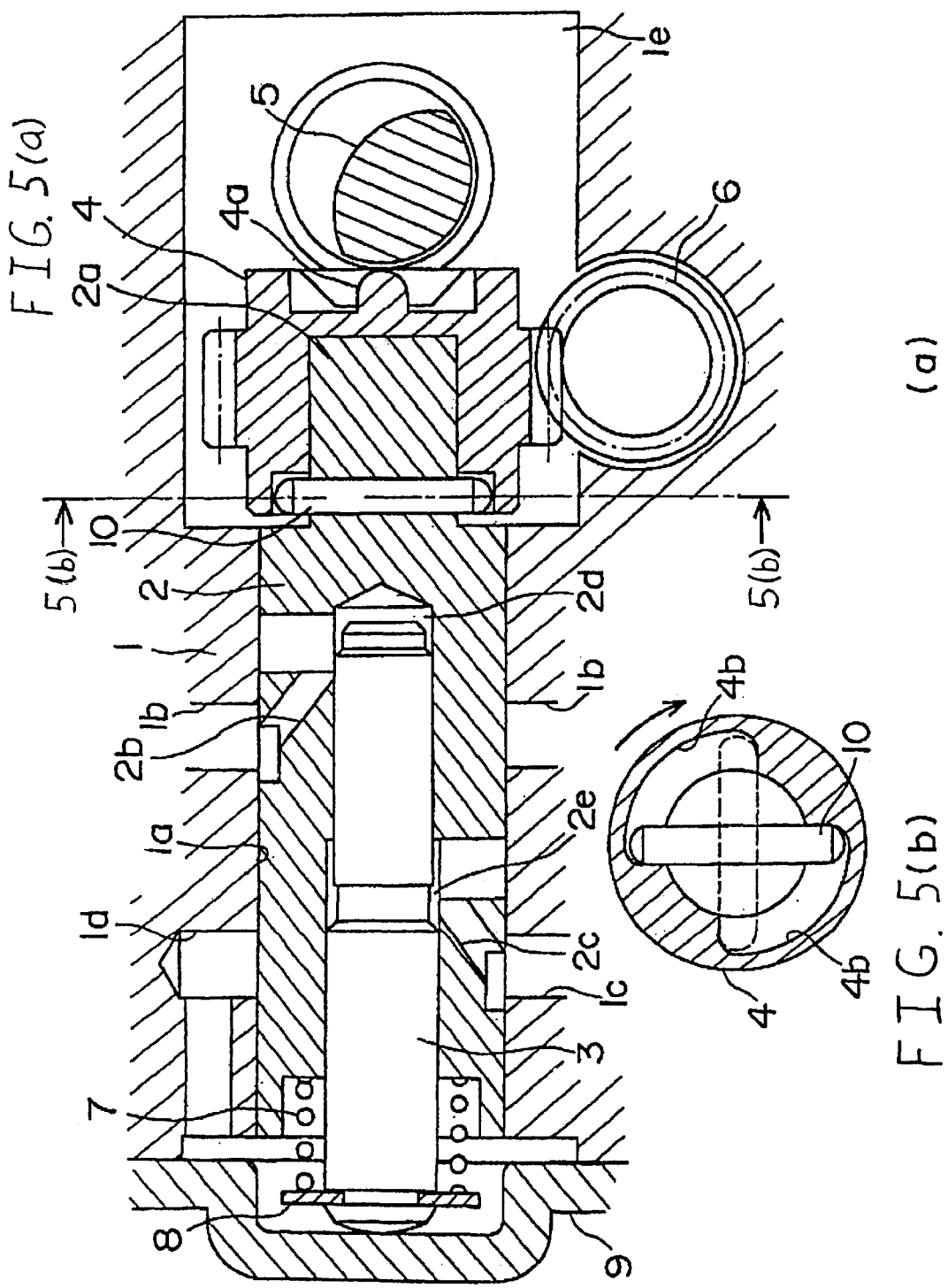
FIG. 5(*a*) is an enlarged view of a main portion in FIG. 4 and FIG. 5(*b*) is a cross-sectional view taken along line 5*b*—5*b* in FIG. 5(*a*).

An oil pump for separate lubrication in an embodiment of the present invention will next be explained with reference to the drawings. FIG. 1 is a bottom view showing the oil pump for separate lubrication in the embodiment of the present invention. FIG. 2 is a rear view showing the oil pump for separate lubrication. FIG. 3 is a side view showing the oil pump for separate lubrication. FIG. 4 is a cross-sectional view taken along line 4—4 in FIG. 1. FIG. 5(*a*) is an enlarged view of a main portion in FIG. 1 and FIG. 5(*b*) is a cross-sectional view taken along line 5*b*—5*b* in FIG. 5(*a*).

A cylinder 1*a* for fitting a distributor 2 thereto and an oil chamber 1*e* connected to this cylinder 1*a* are arranged in a pump body 1 shown in FIG. 4 and 5(*a*). These spaces are partitioned from the exterior by a cover 9 and a flange 11 fastened and attached by a screw 18. O-rings 13 and 12 are respectively interposed between the cover 9, the flange 11 and the pump body.

An oil is supplied through a nipple 11a integrated with the flange 11 and is discharged from outlet ports 1b, 1b, 1c. The distributor 2 has pump chambers 2d and 2e of different diameters for fitting the plunger 3. These pump chambers 2d and 2e are respectively communicated with a circumferential face of the distributor 2 by inlet-outlet paths 2b and 2c.

Portions conforming to the diameters of the respective pump chambers are formed in the plunger 3 fitted to the pump chambers 2d and 2e of the distributor 2. A shaft 2a is arranged on a side face opposed to opening faces of the pump chambers of the distributor 2. This shaft 2a is covered with a worm wheel 4. As shown in FIG. 5(b), a pin 10 inserted into the shaft 2a is engaged with concave portions 4b, 4b of the worm wheel 4. Namely, the worm wheel 4 and the distributor 2 are engaged with each other with play in a rotating direction.

A driving worm 6 engaged with the worm wheel 4 is rotatably arranged in the oil chamber 1e of the pump body 1 and the rotation of an engine is transmitted to this driving worm 6. A discharging amount setting cam 5 is also rotatably arranged in the oil chamber 1e. The discharging amount setting cam 5 is rotated in association with a throttle valve.

A compression coil spring 7 is interposed between the distributor 2 and a snap ring 8 fitted to the plunger 3. A lead cam 4a formed in the worm wheel 4 comes in press contact with the discharging amount setting cam 5 by the compression coil spring 7. Further, a tip convex portion of the plunger 3 comes in press contact with the cover 9 by the compression coil spring 7. Thus, plunger 3 is not moved in an axial direction, but the distributor 2 is reciprocated twice in one rotation in the axial direction while the distributor 2 is rotated integrally with the worm wheel 4.

Outlet holes 1b, 1b and outlet holes 1c, 1d are arranged at intervals of 180° in the pump body 1 in positions in which inlet-outlet paths of the distributor 2 are respectively opened. Inlet ports are arranged in intervals of 180° in positions shifted from outlet holes 1b, 1b and outlet holes 1c, 1d in the axial direction and are communicated with the oil chamber 1e although these inlet ports and their communication paths are not illustrated in the sectional view of FIG. 5.

Figure 6:
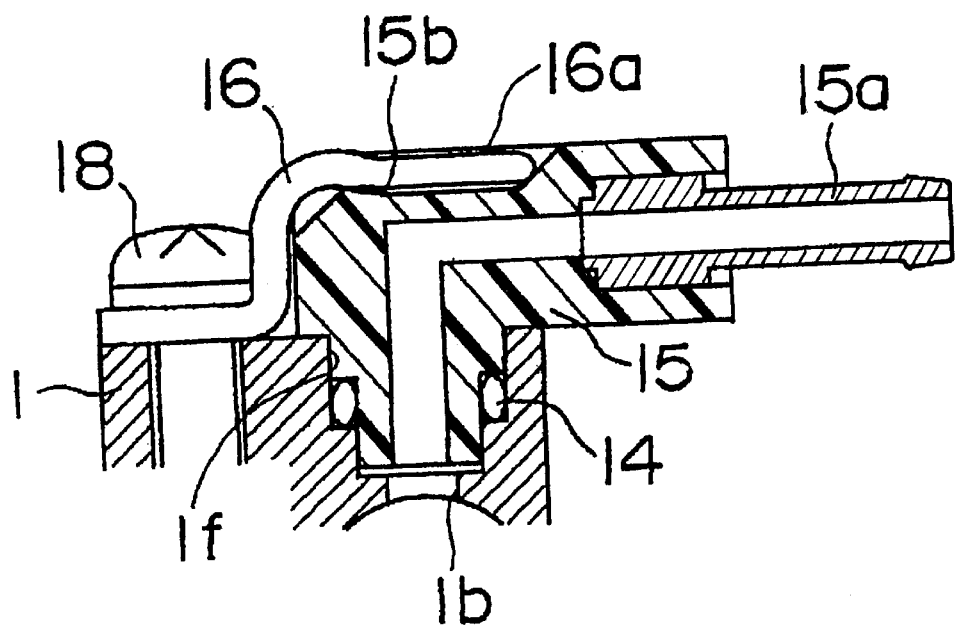
FIG. 6 is a partial sectional view taken along line 6—6 in FIG. 1.

As shown in FIG. 6, outlet holes 1b, 1b and outlet hole 1c are communicated with a fitting hole 1f formed in the pump body 1. This fitting hole 1f is formed by mold drawing, and a nipple body 15 made of resin and covered with each O-ring 14 is inserted into this fitting hole 1f. A metallic pipe 15a for connecting an oil supply hose is adhered to the nipple body 15.

A pressing portion 16a of a nipple fixing plate 16 fastened and attached to the pump body 1 is fitted by a screw 18 to a groove 15b formed in a head portion of the nipple body 15. The nipple body 15 is fixed by stopping rotation of this nipple body 15 by the nipple fixing plate 16. Two fitting holes 1f are formed on a lower face side of the pump body 1. The nipple bodies 15, 15 are fixed by the nipple fixing plate 16 having two pressing portions 16a. As shown in FIGS. 2 and 3, one fitting hole is formed on an upper face side of the pump body 1 and the nipple body 15 is fixed by a nipple fixing plate 17 having one pressing portion 17a.

In the above construction, when the worm wheel 4 is rotated by the driving worm 6, the lead cam 4a of the worm wheel 4 comes in slide contact with the discharging amount setting cam and the distributor 2 is reciprocated twice per one rotation in the axial direction integrally with the worm wheel 4.

At an inlet stroke at which the distributor 2 is moved in a rightward direction in any rotating direction, the inlet-outlet paths 2b and 2c are communicated with the inlet ports of the pump body. At an outlet stroke at which the distributor 2 is moved in a leftward direction, the inlet-outlet paths 2b and 2c are respectively communicated with outlet ports 1b, 1b and outlet ports 1c, 1d of the pump body. The two outlet ports 1b, 1b respectively supply an equal amount of oil to different oil supply ports, and the outlet port 1c supplies the oil to another oil supply port.

The present pump uses a 3-discharge method with respect to the pump body 1 capable of performing a 4-discharge operation. Therefore, one discharge (outlet port 1d) within the four discharges is returned to an inlet side (the interior of the pump). The stroke of the distributor 2 can be changed in accordance with a rotating position of the discharging amount setting cam 5. An oil amount corresponding to an output of the engine can be supplied to the engine by operating the discharging amount setting cam 5 and a shaft of the throttle valve in association with each other.

In the above construction, the plunger 3 is arranged such that the plunger 3 goes in and out of the distributor 2 from a side opposed to the worm wheel 5. Accordingly, outlet ports 1b, 1b and 1c of the pump body can be arranged to approach a side of the driving worm 6 so that the pump can be made compact. Further, since a hollow portion of the worm wheel 4 is supported by the shaft 2a arranged in the plunger 3, it is not necessary to arrange a shaft for supporting the worm wheel 4 in this worm wheel 4 so that the pump can be made further compact.

The fitting hole 1f for attaching the nipple can be formed by mold drawing so that the pump body can be simply processed. Further, the nipple is attached by only pressing the nipple body by the insertion nipple fixing plate so that an assembly work can be simply made. The direction of a pipe connected to the oil supply hose can be simply set by only changing the direction of a groove formed in a head portion of the nipple body. Further, since the pipe connected to the oil supply hose is formed by a metal, there is no fear of breakage and damage of the pipe.

In accordance with the present invention, there is no back gear and an oil pump for separate lubrication with the rotation of an engine as a driving source can be made compact even when the engine is reversely rotated.

Further, there is no fear of damage of the nipple connected to the oil supply hose and processing of the pump body and an attaching work for attaching the nipple are simple. Furthermore, a direction of the nipple connected to the oil supply hose can be simply changed.

What is claimed is:

1. An oil pump for separate lubrication characterized in that a distributor is fitted to a cylinder arranged in a pump body so as to be rotated and moved in an axial direction; a plunger is fitted to a pump chamber arranged in said distributor so as to go in and out of the pump chamber; a shaft arranged on a side opposed to the pump chamber of said distributor is covered with a worm wheel engaged with a driving worm, and a pin inserted into said shaft is engaged with a concave portion formed in said worm wheel with play; a lead cam arranged in said worm wheel comes in press contact with a discharging amount setting cam and said plunger comes in press contact with a cover for closing said cylinder by a spring interposed between said distributor and the plunger; an inlet-outlet path communicated with said pump chamber and opened to a circumferential face of the distributor is arranged in said distributor; an outlet hole and an inlet hole conforming to an opening position of said inlet-outlet path in a position in the axial direction of the cylinder are arranged in said pump body; a nipple for connection to a hose for supplying an oil to an engine is fitted to a fitting hole of the pump body communicated with said outlet hole of the oil pump for separate lubrication; said nipple is constructed such that a metallic pipe connected to the hose is adhered to a side face of a nipple body made of resin; a basic end portion of said nipple body is covered with an O-ring and the O-ring is inserted into said fitting hole; and a nipple fixing plate fitted to a groove formed in a head portion of said nipple body and pressing the nipple body is fastened and attached to the pump body.

* * * * *